Sept. 7, 1948. O. B. MERRILL 2,449,000
CORE FOR CLOSURE FRAME TRIM ELEMENTS
Filed Dec. 11, 1946
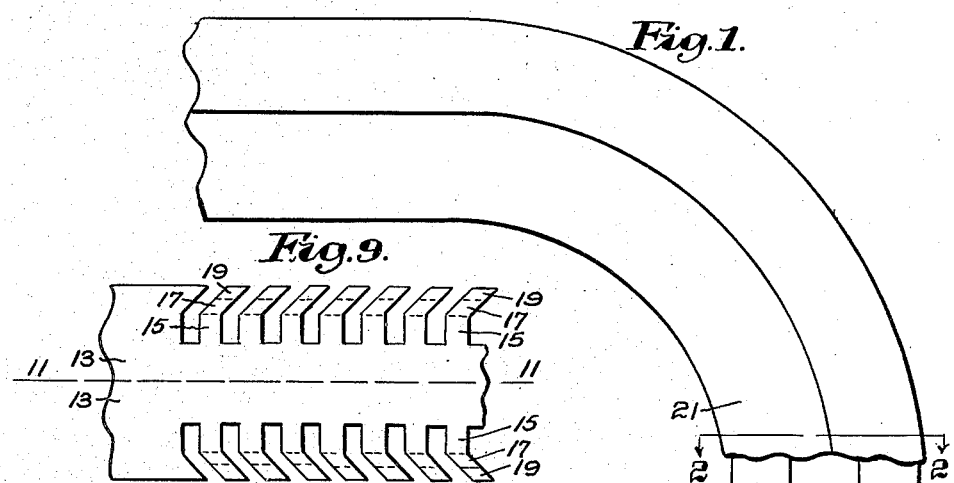
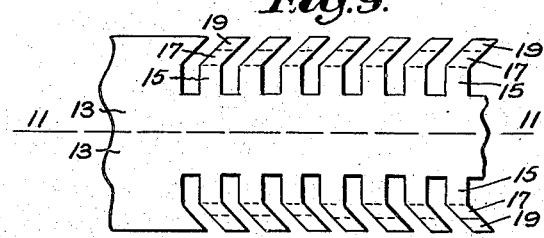
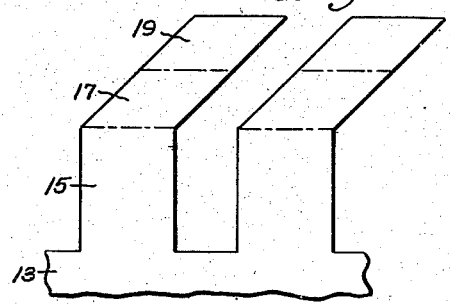
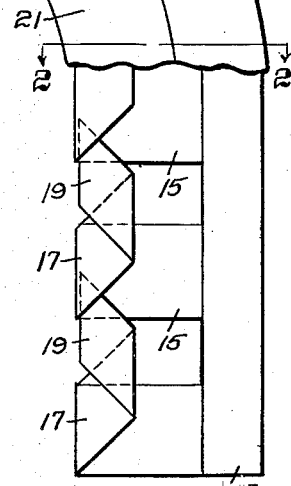
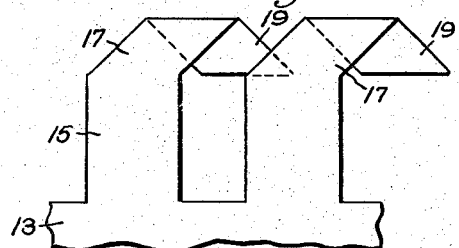
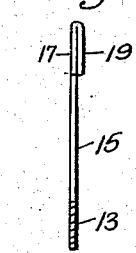
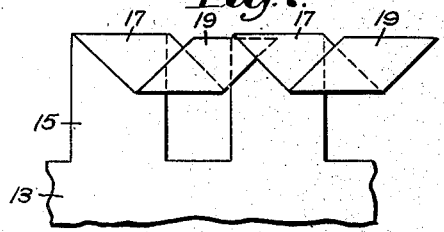
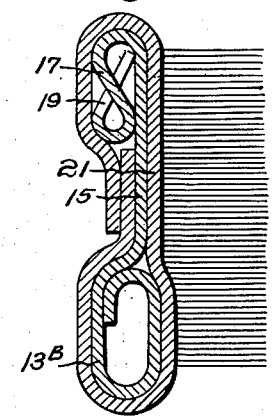
Inventor:
Oliver B. Merrill
by Emery, Booth, Townsend, Miller Widen
Attys Patented Sept. 7, 1948

2,449,000

UNITED STATES PATENT OFFICE 2,449,000

CORE FOR CLOSURE FRAME TRIM ELEMENTS

Oliver B. Merrill, Amesbury, Mass.

Application December 11, 1946, Serial No. 715,365

3 Claims. (Cl. 189—34)

This invention relates to trim elements for closure frames, such as those of automobile doors, windows and the like, which elements cooperate with the closures for the frames, and more particularly it relates to the core of such an element which carries or is covered by suitable soft material which makes direct contact with the closure and which also may support ornamental finish elements.

Such a core may be made of flexible but not limp sheet material, such as thin soft metal, and it should be possible to bend it to suit curved portions of the openings to which it is applied without distortion of its general shape although a considerable area may be disposed in the plane of the bend. An example is a weather strip for application to a portion of the door frame which faces the window glass and closes the joint between the two, such as herein illustrated, and which, if applied to a window opening having a partially curved boundary, must be curved to that boundary in the plane of its width. The present construction may be considered as an improvement on that disclosed in my copending application, Serial No. 705,393, filed October 24, 1946, now Patent No. 2,434,504, issued January 13, 1948.

As I anticipate a major field for the application of the invention to be in the production of weather strip such as that which is applied along the belt line of an automobile door to cooperate with the sliding glass, I have here illustrated the construction of such a strip in the accompanying drawing by way of example and will describe it in detail in the following specification. In the drawing—

Fig. 1 is an elevation of a portion of weather strip bent to curvilinear form in its plane with part of the covering broken away to reveal the construction of the core;

Fig. 2 is a section on the line 2—2 of Fig. 1 on a larger scale;

Fig. 3 is a broken elevation showing a portion of the edge of a strip before it is bent;

Fig. 4 is a section thereof looking toward the left in Fig. 3;

Figs. 5 and 6 are views similar to Figs. 3 and 4 after an initial bending operation;

Figs. 7 and 8 are views similar to Figs. 3 and 4 after the bending operation is completed; and Fig. 9 is a plan view of a portion of a blank from which the trim elements may be manufactured.

Figs. 3 through 8 are somewhat diagrammatic, as will hereinafter be explained.

Referring now to Fig. 9, I have there shown a portion of a strip of suitable metal cut out to form a blank which, when a weather strip of the type herein disclosed embodying only a single substantially plane portion is to be made, may be divided along its longitudinal center line 11, each half of the strip providing for the formation of a complete weather strip when bent into form as hereinafter described and when suitable cushioning material or covering is applied thereto. When so divided, each half comprises a portion 13 along one edge which is continuous and from which projects a series of independent spaced narrow tongues (made up of the portions 15, 17 and 19 hereinafter to be referred to). As herein shown, these tongues comprise inner portions 15 projecting substantially at right angles to the length of the central zone 13 and terminal portions or extensions, which may be considered as comprising proximal portions 17 and distal portions 19, which extend at an angle from the outer ends of the inner portions 15 and which may be generally in the form of rhomboids or oblique parallelograms, one of the smaller parallel sides of each of which corresponds to its line of junction with the inner portion 15 from which it extends.

As illustrated in Fig. 2, the continuous portion 13 of the blank formed by dividing the structure of Fig. 9 in half may be rolled up to form a bead 13B corresponding to one edge of the core which may, as shown, be centralized relatively to the intermediate portion of the core comprising any unrolled part of 13 and at least the root parts of the tongues. The obliquely directed extensions of the tongues are bent in the manner to be described in detail in connection with Figs. 3 through 8 to provide along the opposite edge of the core an effectively continuous but longitudinally compressible edge portion.

Figs. 3 through 8 are to a certain extent diagrammatic in that they represent rather the geometrical theory underlying the bending of the blank than the exact physical results of such bending and might be said to represent the result if it were a question of carefully folding a thin sheet of paper. In the actual manufacturing process and where we have a strip of metal of substantial thickness (in practice about .015 inch) the regularity shown in these figures will not be attained but an understanding of the operation may be more readily had from an ideally regular drawing than from one attempting more realistically to reproduce an actual physical structure. This implies a certain inconsistency between Figs. 3, 5 and 7 on the one hand and Figs.

4, 6 and 8 on the other, since necessarily in the latter a substantial thickness is shown. Also in these figures I have illustrated merely two adjacent tongues without attempting to show how other tongues to the right or left would enter into the complete result.

Fig. 3 shows the tongues as in the blank with the inner portions 15 and the extensions including proximal portions 17 and distal portions 19 all in the same plane, and I have indicated in Fig. 3 by dot and dash line a fold line at the junction of the extensions with the inner portions 15 and that along the median of the parallelogram dividing it into the portions 17 and 19. In Fig. 5 the distal portions 19 have been folded over away from the reader on the fold line corresponding to the median. Because of the oblique disposition of the extensions of the tongues, the folds being made along a line generally longitudinal of the strip, the point of the folded-over distal portion 19 shown at the left in Fig. 5 extends across the space between the two tongues beyond the plane of the left-hand edge of the right-hand element 16. The extension is then reversely rebent, that is, toward the reader in Fig. 7, along the line of junction of the extension with the inner portions 15 of the tongues. The proximal portion 17 at the right of the figure then overlies the nearer face of the portion 15 from which it arises, providing therewith an open-ended socket into which the distal portion 19 at the left telescopically and slidably extends, the proximal portion 17 at the right overlying the distal portion pertaining to the tongue at the left and confining it in the plane between said right-hand proximal portion 17 and the inner portion 16 of the tongue from which it arises. The distal portion 19 of the right-hand tongue, however, lies at the face of the proximal portion 17 nearer the reader, viewing Fig. 7, that is, on the face opposite to that which overlies the distal portion 19 arising from the tongue at the left, and it extends in turn beneath and is overlain by the proximal portion of a succeeding tongue in the series, not shown in these figures but which would be the next tongue to the right.

If a strip having a series of tongues engaged with each other as shown in the case of two tongues in Fig. 7 is bent to a curve concave upwardly, viewing Fig. 7, the several distal elements 19 may slide in the sockets or pockets provided by the overlying proximal portions 17 of succeeding tongues. The part of the distal portion 19 of that succeeding tongue which is coextensive in Fig. 7 with its proximal portion, however, is disposed in a plane different from that of the telescopically engaged end of the distal portion of the preceding tongue. The parts can move freely even when the core is bent to a sharp curve without causing the ends of the portions 19 which enter the sockets provided by the succeeding tongues (to the right in Fig. 7) to engage the distal portion 19 of that succeeding tongue, which engagement might occur to limit such movement if the oppositely facing edges of adjacent parts 19 were in the same plane.

As in the case of the construction of my previous application referred to, the edge of the strip formed by these bent and interengaged tongues constitutes an effectively continuous but longitudinally compressible edge portion for the strip which forms the core.

A covering may be applied in various ways to a core constructed in the manner described. In the case of the example shown in Figs. 1 and 2, the core is completely enclosed, a textile covering 21 of known form with a contacting surface of pile weave being folded in enclosing relation about the core and secured thereto.

It will be understood that in manufacture a strip of metal may be advanced longitudinally past several operating stations and the different bending operations may be performed and the covering strip 21 applied at successive stations so that figures such as 3, 5 and 7 would illustrate successive portions of a single blank at an intermediate stage of its processing. I have considered that the disclosure would be simplified by showing in separate views the forms successively attained.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A core for a trim element which is mounted on a closure frame and adapted to cooperate with a portion of the closure for the frame, which core comprises an elongated strip of material of substantial width lying substantially in a plane but capable of being bent curvilinearly in that plane, the strip formed of sheet material and comprising a substantially continuous portion along one side from which projects a series of independent spaced tongues having terminal extensions of generally rhomboidal shape which are bent and reversely rebent between the ends and along their proximal ends respectively, the distal portion of each overlapping an adjacent tongue of the series and extending beneath the proximal bent over portion of the extension of said adjacent tongue on the opposite side from the similarly bent over distal portion of that extension.

2. A core for a trim element which is mounted on a closure frame and adapted to cooperate with a portion of the closure for the frame, which core comprises an elongated strip of material of substantial width lying substantially in a plane but capable of being bent curvilinearly in that plane, the strip formed of sheet material and comprising a substantially continuous portion along one side from which projects a series of independent spaced tongues having terminal portions bent and reversely rebent to provide, proximally, open-ended sockets disposed substantially longitudinally and, distally, ends lying on the outer side of said sockets and telescopically engaging within the socket formed from an adjacent tongue but out of alignment with the distal end of said adjacent tongue to provide an effectively continuous but longitudinally compressible edge portion for said strip.

3. A core for a trim element which is mounted on a closure frame and adapted to cooperate with a portion of the closure for the frame, which core comprises an elongated strip of material of substantial width lying substantially in a plane but capable of being bent curvilinearly in that plane, the strip formed of sheet material and comprising a substantially continuous portion along one side from which projects a series of independent spaced tongues, at least the outer portions of which, are bent and reversely bent along lines longitudinal to the strip and include each a proximal portion extending obliquely to the length of the strip and a distal portion of opposite obliquity, the proximal portion extending over the distal portion of a preceding tongue of the series to confine it in the plane between said proximal portion and in the inner part of the tongue from which it arises and the distal portion lying at the face of the proximal portion opposite to that which faces the before mentioned distal portion of the preceding tongue and over which extends in turn the proximal portion of a succeeding tongue in the series.

OLIVER B. MERRILL.